(12) United States Patent
Gupta

(10) Patent No.: US 7,058,605 B2
(45) Date of Patent: Jun. 6, 2006

(54) DOCUMENT TRANSFER SYSTEMS

(75) Inventor: Dipankar Gupta, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 10/052,363

(22) Filed: Jan. 18, 2002

(65) Prior Publication Data

US 2002/0091640 A1 Jul. 11, 2002

Related U.S. Application Data

(62) Division of application No. 09/248,676, filed on Feb. 11, 1999.

(30) Foreign Application Priority Data

Feb. 12, 1998 (EP) .................................. 98301021

(51) Int. Cl.
*H04I 9/00* (2006.01)
*G06F 17/00* (2006.01)

(52) U.S. Cl. ........................... 705/51; 705/50; 705/71; 705/59; 705/64; 705/55; 380/45; 380/55

(58) Field of Classification Search .................. 705/51, 705/71; 707/9; 280/228; 380/203
See application file for complete search history.

(56) References Cited

U.S. PATENT DOCUMENTS

| | | | |
|---|---|---|---|
| 4,841,433 A * | 6/1989 | Hakim et al. .................... 707/3 |
| 5,222,136 A | 6/1993 | Rasmussen et al. ............ 380/9 |
| 5,301,247 A | 4/1994 | Rasmussen et al. ........... 380/43 |
| 5,310,997 A | 5/1994 | Roach et al. ................ 235/375 |
| 5,416,841 A | 5/1995 | Merrick ......................... 380/29 |
| 5,532,920 A * | 7/1996 | Hartrick et al. .............. 715/500 |
| 5,629,980 A * | 5/1997 | Stefik et al. ................... 705/54 |
| 5,629,982 A | 5/1997 | Micali .......................... 380/30 |
| 5,666,414 A * | 9/1997 | Micali ......................... 380/286 |
| 5,666,420 A | 9/1997 | Micali .......................... 380/30 |
| 5,671,280 A | 9/1997 | Rosen .......................... 380/24 |
| 5,737,419 A * | 4/1998 | Ganesan ...................... 713/169 |
| 5,784,460 A | 7/1998 | Blumenthal et al. ........... 380/4 |
| 5,794,207 A | 8/1998 | Walker et al. ................ 705/23 |
| 5,799,086 A | 8/1998 | Sudia .......................... 380/23 |
| 5,841,864 A * | 11/1998 | Klayman et al. ........... 713/171 |
| 5,889,860 A | 3/1999 | Eller et al. ...................... 380/4 |
| 5,923,754 A | 7/1999 | Angelo et al. ................. 380/4 |
| 6,026,163 A | 2/2000 | Micali .......................... 380/9 |
| 6,041,316 A | 3/2000 | Allen .......................... 705/52 |
| 6,084,968 A | 7/2000 | Kennedy et al. ............ 380/259 |
| 6,192,473 B1 * | 2/2001 | Ryan et al. .................. 713/168 |
| 6,236,971 B1 * | 5/2001 | Stefik et al. .................... 705/1 |
| 6,377,692 B1 * | 4/2002 | Takahashi et al. .......... 380/277 |
| 6,385,728 B1 * | 5/2002 | DeBry ........................ 713/201 |
| 6,398,245 B1 * | 6/2002 | Gruse et al. ................. 280/228 |
| 6,446,051 B1 * | 9/2002 | Gupta .......................... 705/52 |
| 6,513,117 B1 * | 1/2003 | Tarpenning et al. ......... 713/156 |

(Continued)

FOREIGN PATENT DOCUMENTS

EP 0 626 776 11/1994

(Continued)

OTHER PUBLICATIONS

Salowey, J., "Kerberos: A Secure Passport," *Performance Computing*, (Sep. 1998).

(Continued)

*Primary Examiner*—Firmin Backer

(57) ABSTRACT

A document transfer system enabling a consumer to obtain a document from an owner upon payment uses a cryptographic protocol involving the consumer, the owner, a document source, such as a printer, and a mediator.

15 Claims, 2 Drawing Sheets

U.S. PATENT DOCUMENTS

| | | | |
|---|---|---|---|
| 6,744,894 B1* | 6/2004 | Saito | 380/277 |
| 2001/0001876 A1* | 5/2001 | Morgan et al. | 713/171 |
| 2001/0046298 A1* | 11/2001 | Terada et al. | 380/252 |
| 2002/0059238 A1* | 5/2002 | Saito | 707/9 |
| 2002/0194485 A1* | 12/2002 | Ram et al. | 713/193 |
| 2003/0088784 A1* | 5/2003 | Ginter et al. | 713/189 |

FOREIGN PATENT DOCUMENTS

| | | |
|---|---|---|
| EP | 0 695 076 | 1/1996 |
| EP | 0 738 058 A2 | 10/1996 |
| GB | 2245752 A * | 1/1992 |
| JP | 410200519 A | 7/1998 |

OTHER PUBLICATIONS

"An Introduction to Electronic Commerce," URL http://www.worldquest.com/wqu/elecomm.html, (Nov. 24, 1995).

Stadler, M., "Publicly Verifiable Secret Sharing," *Advances in Cryptology—Eurocrypt '96, International Conference on the Theory and Application of Cryptographic Techniques*, Saragossa, Spain, vol. 1070, pp. 190-199 (May 1996).

Brands, S., "An Efficient Off-line Electronic Cash System Based on the Representation Problem," *Technical Report*, CS-R9323, Amsterdam, 77 pages, (1993).

Franklin, M., and M. Reiter, "Fair Exchange with a Semi-Trusted Third Party," *Proceedings of the 4th ACM Conference on Computer and Communications Security*, 6 pages, (1997).

Asokan, N., et al., "Optimistic Protocols for Fair Exchange," *Proceedings fo the 4th ACM Conference on Computer and Communications Security*, 11 pages, (1997).

* cited by examiner

DOCUMENT TRANSFER SYSTEMS

This is a divisional of co-pending U.S. Ser. No. 09/248,676 filed Feb. 11, 1999.

The present invention relates to document transfer systems and in particular relates to such systems involving cryptographic protocols enabling a document to be obtained by a consumer upon payment to the owner of the document.

It would be desirable for the protocol to have strong fairness properties, i.e. a guarantee that, at the end of the protocol, either both the owner and the consumer receive payment and the document respectively, or neither party receives anything useful.

There is a substantial body of work on fair exchange and cryptographic services which use this primitive. For protocols requiring fairness in the absence of third parties, the definition of fairness is necessarily probabilistic, and such protocols are usually based on the gradual release of secrets. The following documents describe recent work on practical proposals for fair exchange which use a third party with varying trust assumptions:

(a) Matthew K. Franklin and Michael K. Reiter, *Fair Exchange with a Semi-Trusted Third Party*, Proceedings of the 4th ACM Conference on Computer and Communications Security, 1997; this document describes a fair exchange protocol with a semi-trusted third party with trust assumptions similar to those used in the present invention. The third party inthis case, however, is online even if the parties follow the protocol faithfully;

(b) U.S. Pat. No. 5,666,420 entitled "Simultaneous Electronic Transactions" in the name of Silvio Micali describes an optimistic protocol for certified electronic mail with sleeping post offices;

(c) N. Asokan, M. Schunter and M. Waidner, *Optimistic Protocols for Fair Exchange*, Proceedings of the 4th ACM Conference on Computer and Communications Security, 1997; this document describes a practical optimistic protocol for fari exchange. However, this protocol increases the trust requirements on the third party in the event of a dispute resolution being required. In particular, the third party inspects the contents of a message containing the item being exchanged while resolving disputes. In addition, the described protocol family has a synchronous time model which may not be suitable for certain applications.

In accordance with a first aspect of the present invention there is provided a cryptographic method of enabling a consumer to obtain a document from an owner upon a payment.

In accordance with a second aspect of the present invention there is provided a cryptographic method of enabling a consumer to obtain a document from an owner upon a payment.

The first and third portions of a key are preferably different.

The method may be arranged for enabling a said consumer to receive a plurality of such documents, wherein said key is divided into different respective sets of portions for each document.

The document source is preferably a printer.

In the preferred embodiment, the ordering protocol is carried out in the presence of a mediator with minimal trust assumptions. The protocol is optimistic, in that the mediator remains off-line except in the case of dispute resolution. In addition, the mediator does not learn any information about the document, even in the event of a dispute.

In accordance with a third aspect of the present invention there is provided a document source for use in one of the above-described methods.

In accordance with a fourth aspect of the present invention, there is provided a document source.

The document source is preferably a printer which is advantageously arranged to print a number of copies of a said document in each of a plurality of formats.

The printer may be arranged to print only one copy of a said document in a first format and an unlimited number of copies of said document in a second format.

The formats may comprise different resolutions or a choice of monochrome and colour images.

In accordance with a fifth aspect of the present invention, there is provided a fair exchange method of enabling a consumer to obtain a document from an owner upon a payment.

In accordance with a sixth aspect of the present invention there is provided a cryptographic method of enabling a first party to obtain an item of value from a second party upon receipt by said second party of a second item of value.

In accordance with a seventh aspect of the present invention there is provided a fair exchange method of enabling a contract between a buyer and a seller of a commodity.

Figure 1:
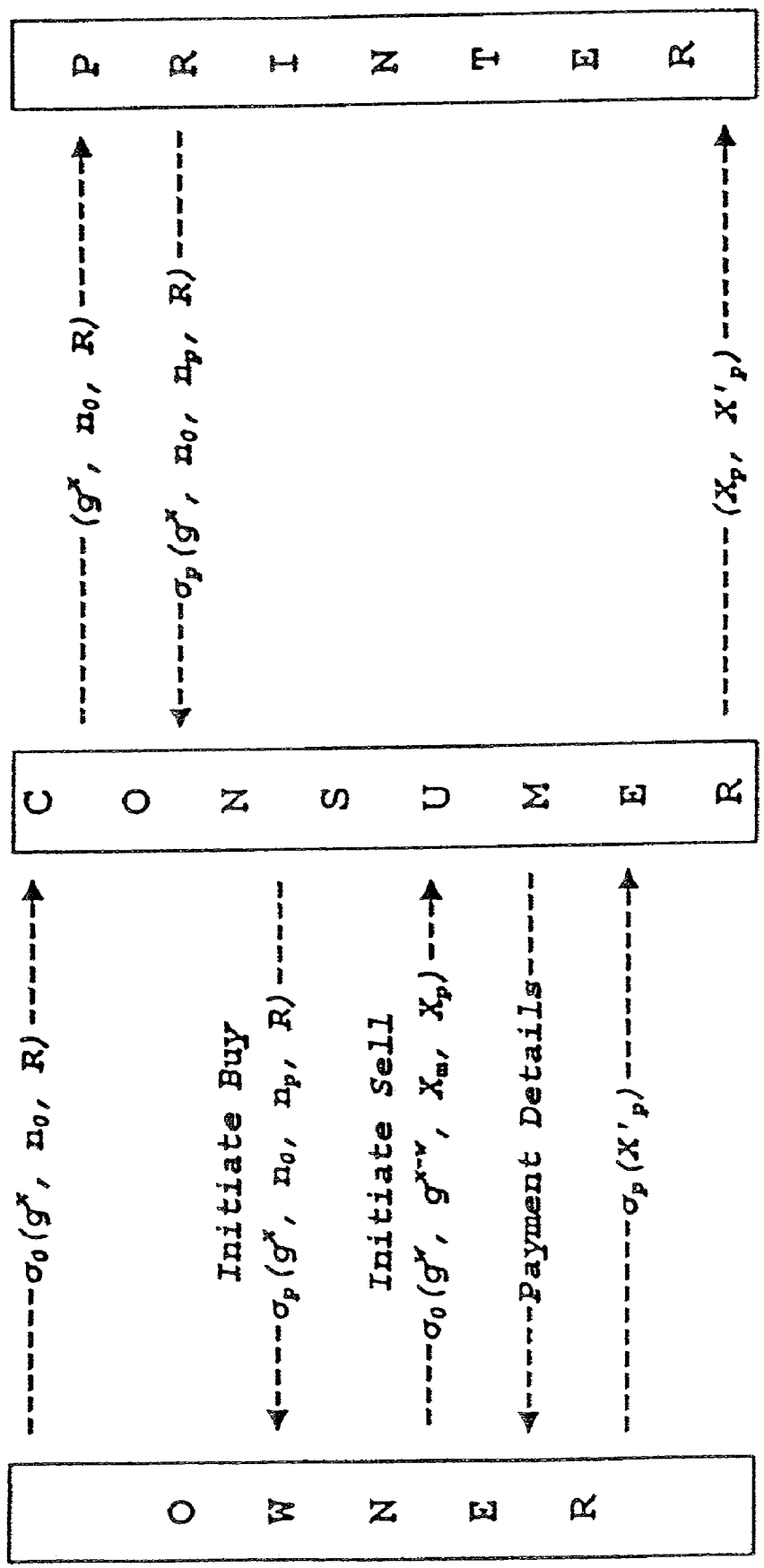
FIG. 1 shows in diagrammatic form the protocol of the preferred embodiment of the present invention.

A preferred embodiment of the present invention will now be described with reference to the accompanying drawing which illustrates the protocol of the preferred embodiment.

The parties involved in the protocol are:

(a) The owner O of a printable document who wishes to charge end users for prints of the document. For the purposes of payment, the copyright owner adopts the role of a merchant in SET terminology;

(b) The consumer C who wishes to print the copyrighted material and pay for it. C assumes the role of cardholder in SET terminology for the payment phase.

(c) The printer P which is the physical printer device intended to print the document. The printer can sign random nonces and perform ElGamal decryptions. It has its private signing key in a temper-resistant store. Its function upon receipt of a document is to run the protocol to recover the encryption key and thereafter to decrypt and render the document. The printer can understand a copyright specification language and is trusted by the owner to follow the agreement. The printer does not need to verify any signatures, this being performed by the consumer. There is thus no requirement that any set of trusted root keys be maintained;

(d) The mediator M, a semi-trusted third party who mediates the transaction between the owner and the consumer and who can arbitrate in the event that the parties do not follow the protocol.

As can be seen from the above, there is a distinction between the two roles of the consumer and the printer. This is important, because of the underlying trust assumption, namely that the printer can be entrusted by the owner to respect the conditions of a copyright agreement, whereas it may not be reasonable to assume that the consume would do the same.

The requirement for a payment protocol are that a payment request can be linked to some order information in a non-repudiable manner and that it is possible for the consumer to query the status of a payment request. For illustration, the SET protocol is used below to describe the payment phase.

The parties share a large Sophie Germain prime number p, i.e. one satisfying the relation:

$$q=(p-1)/2,$$

where q is also a prime number.

The documents are distributed in an encrypted manner using offline or online means. The (bulk) encryption uses key material derived from an integer $x \epsilon F_p$. This can be done, for example, by computing a one-way transformation H(x) and using some output bits as the initialisation vector (IV) and bulk enciphering key k.

The protocol has the following properties:

The secret corresponding to a document is not revealed to the consumer.

If the owner deviates from the protocol, the consumer has an undeniable proof linking the owner to the (incomplete) transaction. It can resolve the dispute with the mediator. This is the only trust assumption on the mediator—in case the owner deviates from the protocol, it promises to perform the dispute resolution steps faithfully.

In the event of a secret associated with a document being invalid, the printer can provably demonstrate its invalidity.

The mediator does not gain any knowledge of the secret unless one of the parties reveals the necessary information.

The protocol is optimistic—if parties execute the protocol steps faithfully, mediation is not required.

The parties share parameters (g, h) where g generates a multiplicative group of prime order p. The element h generates a multiplicative group of prime order $q=(p-1)/2$. The group orders should be chosen such that the discrete logarithm problem is hard in the corresponding multiplicative groups. Computations, unless otherwise specified, occur in the finite field $F_p$.

The parties choose secrets in $F_q$ and publish corresponding public keys in $F_p$. The mediator's public key is:

$$y_m = h^{s_m},$$

and the owner's public key is:

$$y_O = h^{s_O}.$$

The printer and owner use a signature mechanism σ such that the printer's signature $\sigma_p$ and $\sigma_O$ are verifiable by the owner, the consumer and the mediator.

A public commitment $C(x)=g^x \mod p$ to the bulk encryption key is attached to the encrypted content and signed by the owner. We use a protocol described in a paper by Markus Stadler, entitled *Publicly Verifiable Secret Sharing* (Advances in Cryptology—EUROCRYPT '96, Lecture Notes in Computer Science, 1070 (1996), 190–199) to publicly verify the link between a commitment of the form $g^x \mod p$, and the ElGamal encryption of the associated secret x in a known public key using a computationally zero knowledge argument. This arrangement is shown in FIG. 1.

Prior to ordering a document, the owner and consumer agree on a mediator acceptable to both parties. The parties also agree upon an acceptable copyright agreement specified in a manner that is understood by the printer. We denote this string by R.

The owner generates a nonce $n_0 \epsilon Z/p\ Z$ and sends it to the consumer to initiate the protocol.

The consumer sends the document's published value $g^x$, the copyright string R and the owner's nonce $n_0$ to the printer. The printer checks if the string R specifies controls that it can perform. If this is the case, it generates a random number $r_p \epsilon Z/q\ Z$, computes the nonce:

$$n_p = h^{r_p},$$

and sends the tuple ($n_0$, $n_p$, R) signed to the consumer. The nonce $n_p$ will be treated by the printer as a one-time public key exchange key for this transaction. The printer internally keeps track of the association between the copyright string, the public commitment and its own one-time key.

The consumer passes the printer's signed message on to the owner, in addition to any payment-related payload indicating initialisation (for SET, this will be a message to the merchant requesting a wake-up of the consumer's wallet software).

The owner, on receipt of the print request, generates a random value of w between 1 and q−1. It now shares x between the printer and the mediator using a publicly-verifiable 2-out-of-2 sharing scheme.

Secret sharing is effected by performing an ElGamal encryption of w using the printer's one-time key exchange key $n_p$ and of x−w in the mediator's public key $y_m$.

The owner generates ElGamal tuples:

$$X_p = (h^r, n_p^r/w) \text{ and } X_m = (h^s, y_m^s/(x-w))$$

for some values of r, s chosen uniformly at random from [1, . . . , q−1].

The values $g^w$ and $g^{x-w}$, encrypted tuples $X_m$ and $X_p$ and tuple ($n_0$, $n_p$, R) are now sent signed to the consumer in addition to any payment-related payload (for SET, this would be the wake-up message to the consumer's wallet and would include the order data component from the owner).

The consumer (without input from the printer) can verify that the sharing was correctly performed by the owner, and that the encryption is valid. This is effected using the protocol defined in the above-mentioned paper by Stadler.

The consumer now generates its payment message signifying an intended purchase for the key material x. The payment request is cryptographically linked with the nonces associated with the transaction. In case of SET, the transaction would be linked to the Order Data element in the protocol message.

Upon validation of the payment request, the owner now sends the other half of the bulk decryption key encrypted in the one-time key exchange key $n_p$; that is, it sends $X'_p = (h^t, n_p^t/(x-w))$ to the consumer. This is bound with the nonce pair and signed by the owner.

The printer, once in possession of the ElGamal pairs $X_p$ and $X'_p$ recovers x using its one-time secret $r_p$. It can now decrypt the document using x to derive the bulk decipherment key. The printer then proceeds to print the document in agreement with the associated copyright agreement R.

The above protocol is shown diagrammatically in FIG. 1.

The optimistic version of the protocol favours the copyright owner, because the consumer pays for the goods before the encryption key is released by the owner.

In case of disputes, the consumer can present the public transaction details ($n_0$, $n_p$, R), the encrypted shares $X_p$ and $X_m$ and the payment information to the mediator. The mediator can verify the cryptographic link between the payment and the mediator's share. Once this is done, she queries the owner with the transaction ID of the payment. Upon receipt of a satisfactory response (or no response at all), she extracts her share (x−w) and supplies an ElGamal encryption of (x−w) in the appropriate one-time key exchange key of the printer. Since ElGamal encryption is a randomised construction, this will result in a different ElGamal pair with a probability approaching 1.

In addition, the SET 1.0 payment protocol requires resolution outside of the protocol if the merchant does not deliver an InqRes back to the mediator.

The following demonstrates that the protocol is 1-resilient, i.e. any one party can deviate from the protocol without compromising its security, under the decision Diffie-Hellman assumption. The decision Diffie-Hellman assumption is described in a paper by Stefan Brands entitled *An efficient off-line electronic cash scheme based on the representation problem* (Technical Report CS-R9323, CWI, Amsterdam, 1993):

The moderator only knows (x−w) and hence does not learn anything about the secret x unless one of the parties discloses it. This holds even if the moderator resolves a dispute successfully.

If the consumer deviates by not providing a valid payment message, the owner aborts the protocol. Since the secret sharing is perfect zero knowledge, no information about x is revealed.

If the owner does not provide the final encryption $X'_p$ of (x−w), the consumer can request the moderator to decrypt its share $X_m$. The moderator can now compute (x−w) and send it to the consumer encrypted in the printer's one-time key exchange key $n_p$.

The consumer cannot reply previously collected printer tokens (ElGamal signatures by the owner) to the printer, because the key exchange key for the printer, $n_p$, will be different from a previous transaction with a probability approaching 1.

An arbitrary party can build shares corresponding to some x', but it is the consumer's responsibility to tie the commitment $g^{x'}$ of x' to the owner's identity by verifying the owner's signature.

The zero-knowledge protocol described in the above-mentioned paper by Stadler has a round efficiency of ½ and hence requires a significant number of rounds to reduce the error probability acceptably. As noted in Stadler, this proof can be made non-interactive. As a result, the proof need not be performed online by the consumer. Instead, the consumer only checks if the public commitments $C_1=g^w$ and $C_2=g^{x-w}$ match the document's public value $C=g^x$, i.e. whether the relation $C_1C_2=C$ holds true.

In case of a dispute, the mediator can decrypt and verify her share (x−w). She can now run the proof for the printer's share $X_p$. As a result, the protocol is optimistic but fair.

Figure 2:
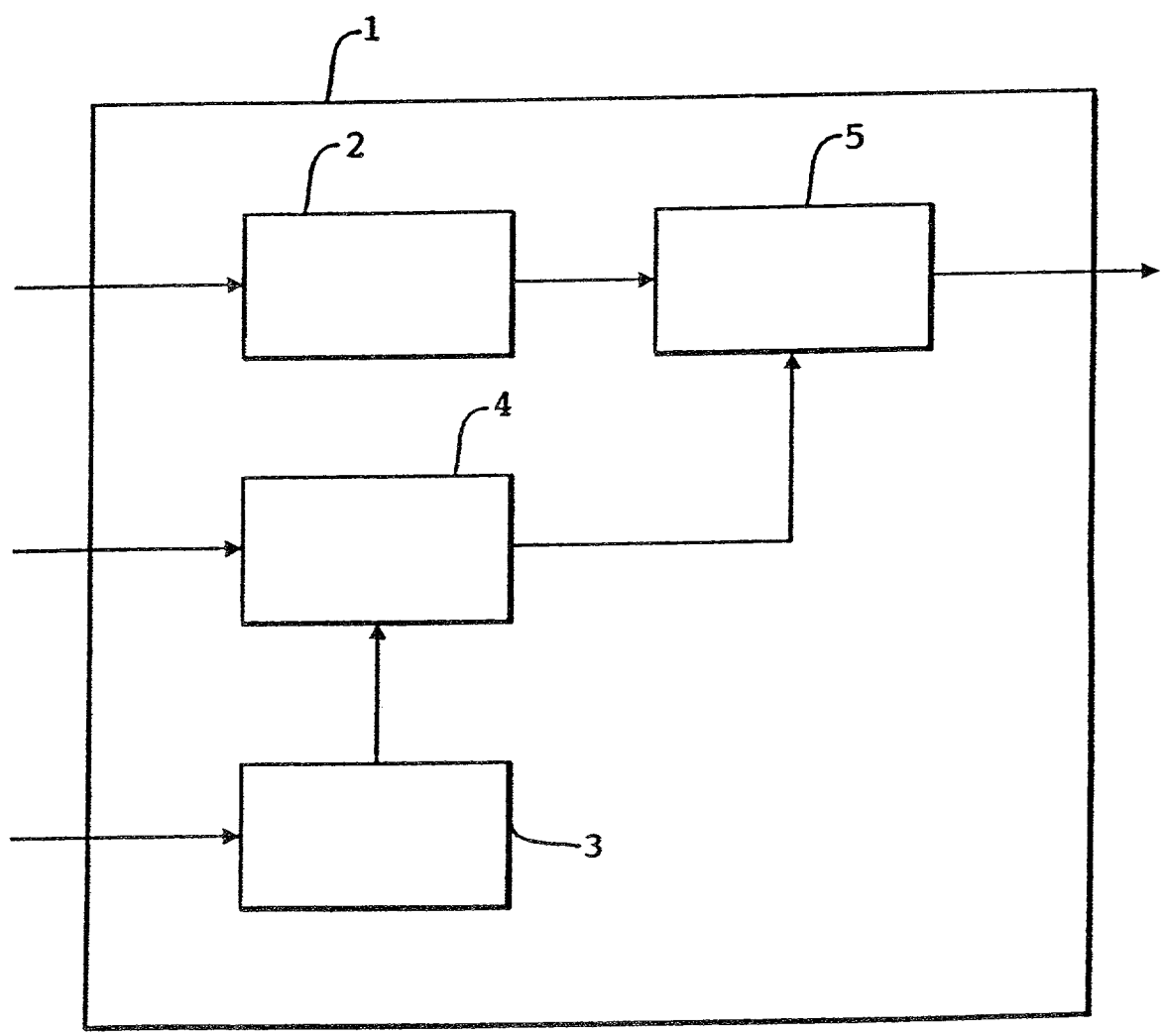
FIG. 2 shows in block diagram form a printer which implements the preferred embodiment of the present invention.

A printer for use in the above methods is described with reference to FIG. 2. The printer 1 comprises a document memory 2 for storing a received encrypted document, a key memory 3 for storing a received first cryptographic key portion from the owner, a processor 4 for receiving a second cryptographic key portion from the owner and combining it with the first key portion stored in the key memory 3 to form a complete cryptographic key which is supplied to a decrypting module 5. The encrypted document stored in the document memory 2 is supplied to the decrypting module 5 whereupon the document is decrypted and supplied to the consumer.

The invention claimed is:

1. A cryptographic method of enabling a consumer to obtain a document from an owner upon making a payment, the method comprising a step of using a protocol involving the consumer, the owner, a document source and a mediator, wherein the source requires knowledge of a key in which said document is encrypted in order to provide the said document, said key comprising a first portion, a second portion, a third portion, and a fourth portion, the protocol comprising the following sequential steps:
   (a) the consumer requests a specified document;
   (b) the owner provides the source with the first and third portions of the key and provides the mediator with the fourth portion of the key, which can combine with the third portion of the key to generate a complete key;
   (c) the consumer provides the owner with the payment; and either:
   (d1) the owner provides the source with the second portion of the key and said first portion of the key is combined with said second portion of the key to generate a complete key; or
   (d2) the owner does not provide the source with the second key portion, and the third key portion is combined with the fourth key portion to generate a complete key.

2. A cryptographic method as claimed in claim 1, wherein said first and said third portions of the key are different.

3. A cryptographic method as claimed in claim 1, and arranged for enabling a said consumer to receive a plurality of such documents, wherein said first and second portions are different for each document.

4. A cryptographic method as claimed in claim 1, wherein the mediator is involved in the protocol only in the event of a dispute between the owner and the consumer.

5. A cryptographic method as claimed in claim 1, wherein the document source comprises a printer.

6. A printer for use in enabling a consumer to print a document from an owner upon making a payment, the printer including:
   (a) a memory for storing a first key portion and a third key portion;
   (b) an element for receiving a second key portion or a fourth key portion; and
   (c) an element for decrypting an encrypted document transmitted thereto in accordance with an encryption key defined by said first and said second key portions or said third and said fourth key portions.

7. A printer as claimed in claim 6, arranged to print a number of copies of a said document in each of a plurality of formats.

8. A printer as claimed in claim 7, arranged to print only one copy of a said document in a first format and an unlimited number of copies of said document in a second format.

9. A printer as claimed in claim 7, wherein said formats comprise different resolutions.

10. A printer as claimed in claim 7, wherein said formats comprise monochrome and color images.

11. A cryptographic method as claim in claim 4 wherein if the consumer provides the owner with the payment, but the owner does not provide the consumer with the second key portion, then the mediator provides the consumer with the fourth key portion.

12. A fair exchange method of enabling a consumer to obtain a document from an owner upon receipt of a payment including the following steps:
   (a) the consumer requests a specified document;
   (b) the owner provides a document source with a first and a third portion of a key to the consumer and the owner also provides a mediator with the fourth portion of the key, which fourth portion of the key can combine with the third portion of the key provided to the consumer to generate a complete key;

(c) the consumer provides the owner with the payment; and either
(d1) the owner provides the document source with a second portion of the key, which can combine with said first portion to generate a complete key allowing the document to be printed; or
(d2) the owner does not provide the source with the second key portion, and the mediator provides the consumer with fourth key portion, which is combined with the third key portion to generate a complete key allowing the document to be printed.

13. A cryptographic method of enabling a consumer to obtain a document from an owner upon making a payment, the method comprising a step of using a protocol involving the consumer, the owner, a document source and a mediator, wherein the source requires knowledge of a key in which said document is encrypted in order to provide the said document, said key comprising a first portion, a second portion, a third portion, and a fourth portion, the protocol comprising the following sequential steps:
   (a) the consumer requests a specified document directly from the owner;
   (b) the owner provides the source with the first and third portions of the key directly to the consumer and provides the mediator with the fourth portion of the key, which can be combined with the third portion of the key to generate a complete key;
   (c) the consumer provides the owner with the payment; and either:
   (d1) the owner provides the source with the second portion of the key and said first portion of the key is combined with said second portion of the key to generate a complete key; or
   (d2) the owner does not provide the source with the second key portion, and in that event, then the mediator supplies the fourth key to the consumer so that the consumer can combine the third key portion with the fourth key portion to generate a complete key.

14. A cryptographic method as claimed in claim 13, wherein the mediator is involved in the protocol only in the event of a dispute between the owner and the consumer.

15. A cryptographic method as claimed in claim 13, wherein the document source comprises a printer.

* * * * *